United States Patent [19]

Branam et al.

[11] Patent Number: 4,856,327
[45] Date of Patent: Aug. 15, 1989

[54] METHOD AND APPARATUS FOR MONITORING AND MEASURING DYNAMIC LOADS IN THRUST INDUCING SYSTEMS

[75] Inventors: Timothy R. Branam, Manitowoc; Jeffrey J. Roberts, Michicot; Jack O. Schoenberger, Two Rivers, all of Wis.

[73] Assignee: General Physics Corporation, Columbia, Md.

[21] Appl. No.: 144,949

[22] Filed: Jan. 19, 1988

[51] Int. Cl.$^4$ .............................................. G01M 19/00
[52] U.S. Cl. .................................... 73/168; 73/862.49
[58] Field of Search .................... 73/761, 785, 862.54, 73/168, 862.49, 862.62, 862.64, 862.51; 137/551–554; 251/129.01, 129.02, 129.03

[56] References Cited

U.S. PATENT DOCUMENTS

| | | | |
|---|---|---|---|
| 4,542,649 | 9/1985 | Charbonneau et al. | 72/862.27 |
| 4,570,903 | 2/1986 | Crass | 73/168 |
| 4,694,390 | 9/1987 | Lee | 251/129.01 |
| 4,805,451 | 2/1989 | Leon | 73/168 |

Primary Examiner—Stewart J. Levy
Assistant Examiner—Robert R. Raevis
Attorney, Agent, or Firm—Andrus, Sceales, Starke & Sawall

[57] ABSTRACT

Actual valve stem thrust loads in a motor operated valve are monitored and measured directly by the use of load cells disposed directly between the valve and the operator. Direct measurement of stem thrust eliminates the errors associated with indirect methods. Analysis of actual thrust load measurements and correlation with other operating parameters, such as switch actuation and motor current, provides the capability to accurately calibrate valve operators and to detect valve and operator problems at an early stage.

12 Claims, 3 Drawing Sheets

METHOD AND APPARATUS FOR MONITORING AND MEASURING DYNAMIC LOADS IN THRUST INDUCING SYSTEMS

BACKGROUND OF THE INVENTION

The present invention relates to a dynamic load measuring system and, more particularly, to a method and apparatus for monitoring and measuring the variable dynamic thrust load imposed on a workpiece, such as a valve stem, by the valve operator.

There are many applications in industry where an operating thrust generated to perform useful work must be carefully monitored and controlled within prescribed limits. Thrust producing operators may be of a pneumatic, mechanical, electromechanical or hydraulic type.

The method and apparatus of the present invention are particularly applicable to the monitoring, measurement, and analysis of dynamic valve stem thrust generated in the operation of motor operated valves. Remotely operated valves are well-known in the industry and are commonly used wherever remote operation of a valve is necessary or desirable, such as because of its critical nature or hazardous location. The power generation, chemical and petrochemical industries use motor operated valves extensively and very often on systems wherein the correct operation of the valve is critical to health and safety, as well as to proper operation of the system.

In most cases, a motor-operated valve cannot be installed and set up (or inspected and tested after initial installation) under actual operating conditions where there is fluid flow in the system in which the valve is installed. Thus, motor operated valves are typically adjusted for proper operation, either initially or as a result of periodic maintenance, under static conditions. As is well-known, however, many of the characteristics of valve operation change or vary substantially under dynamic operating conditions. Such variations may be immediately apparent or appear or become aggravated with time and are dependent on such conditions as the actual fluid operating pressure, operator gear train and valve packing wear, variations in voltage supplied to the operator motor, and the nature of periodic maintenance.

A valve operator, typically comprising a motor-driven gear train attached to the valve stem, must impose enough thrust on the valve stem to move the valve disc or plug to a position in which it will stop the dynamic fluid flow through the valve and to seat tightly enough to produce a leak-tight seal. Valve manufacturers typically specify the minimum level of valve stem thrust which must be applied to the stem to properly seat the attached valve disc or plug in the valve seat. Motor operators used with these valves, in turn, include a torque switch which limits the amount of thrust applied to the valve stem by the operator to a level to produce the desired leak-tight seal (generally with an additional margin for safety). An improperly set torque switch can result, if set too low, in failure of the valve to seat and seal properly and, if set too high, in damage to the operator and/or the valve.

A typical valve operator includes a source of motive power, such as an electric motor, which is connected to the valve stem by a power transmission assembly. Basically, the transmission assembly includes a splined shaft (also called the "worm shaft") driven by the motor through a gear reduction assembly. A worm mounted on the worm shaft drives a worm gear which, in turn, turns a drive sleeve containing a stem nut that surrounds a threaded valve stem. The drive sleeve and stem nut are journalled for rotation about the valve stem, but secured within the operator housing against axial movement, such that rotation of the drive sleeve and stem nut result in axial movement of the valve stem to move the valve disc or plug attached to the stem between the open and closed positions. As the valve disc or plug comes into contact with the valve seat (or backseat) as the valve is closed (or opened), an increasing thrust load is imposed on the valve stem which load is transmitted through the transmission assembly to the worm and results in an axial force tending to move the worm along the worm shaft. The mechanical characteristics of a worm/worm gear set are such that the torque applied by the worm gear is directly related to the axial force on the worm. The worm is attached to the operator housing through a spring pack comprising a set of Belleville washers. As the axial stem thrust increases, the axial force on the worm increases proportionally. The Belleville washer spring pack will eventually compress under the axial load and the worm will move axially along the worm shaft.

The operator assembly also includes a torque switch mounted to the operator housing and the switch includes an arm that engages the worm. Axial movement of the worm against the bias of the spring pack will move the torque switch arm and, when the arm has moved a distance established by the adjustable torque switch setting, the torque switch contacts open and stop the motor. The Belleville washer spring pack is attached to the worm in a manner to bias movement of the worm in either axial direction, depending on whether the stem thrust transmitted back to the worm results from valve closure or opening. The torque switch includes switch arms and contacts which are independently adjustable to monitor worm movement and control motor operation in either direction. Settings are commonly called the "close torque switch setting" and "open torque switch setting". The amount of stem thrust available to operate the valve is dependent directly on the torque switch settings.

Motor operators also typically include limit switch assemblies, which may be used in conjunction with or in lieu of the torque switches. The limit switches operate independently and are typically driven by the worm shaft through a gear assembly to stop valve travel after a preset distance. Some of the specific functions of the limit switches are to stop valve travel in the open direction before the valve backseats, bypass the open torque switch while the valve is being unseated, provide remote light indication of valve position, and actuate interlocks with associated equipment.

On motor operators available today, torque and limit switch settings are rather coarse and imprecise. In particular, the construction of a typical torque switch is such that minor changes in the switch setting can result in large changes in stem thrust. Proper adjustment of torque and limit switches is, of course, critically important and has typically required the use of experienced personnel and time-consuming set-and-try procedures. It is now recognized, however, that the most serious basic problem in utilizing torque switch settings based on spring pack displacement is that such displacement is only an indirect indication of the actual thrust on the valve stem. Variations occur through the transmission assembly and valve which affect the theoretical direct relationship between spring pack displacement and stem thrust. These include the preload imposed on the spring pack when the spring pack is assembled, valve packing frictional forces, and the dead weight of the valve stem and plug or disc. In addition, after a motor operated valve has been installed and set, variations occurring over time as a result of wear, maintenance procedures, variations in operating voltage, and the like may eventually result in actual stem thrusts which are below the minimum required to seat the plug and seal the valve or in excess of the maximum which the valve and operator can withstand without damage.

Thus, there has long been a need for a system which can enhance the accuracy of initial motor operated valve set up, permit the actual stem thrusts to be monitored and measured in operation, and permit direct analysis of the function of various valve and operator components for accurate trouble-shooting.

U.S. Pat. No. 4,542,649 (Charbonneau et al) describes a system which is intended to measure valve stem thrust directly and to provide a dynamic trace of the actual stem load throughout the valve operating cycle. The system and related method also monitor motor current and torque and limit switch actuation over the operating cycle and correlate those parameters to the monitored thrust. Output traces of the three parameters are intended to be used to calibrate the operator assembly for initial operation and to monitor the performance of the motor operated valve over time by generating subsequent traces of the three parameters and comparing them with those generated initially.

To provide an indication of actual valve stem thrust, Charbonneau et al disclose an apparatus including a compression load cell operatively attached to the free end of the valve stem (opposite the plug) which provides a direct measurement of the stem thrust load at the end of the valve opening stroke, i.e. at the upper limit of stem travel. Stated another way, the Charbonneau et al apparatus can measure only the actual stem thrust at which the open torque switch trips. This single measurement of stem thrust is then used to establish both the open and close torque switch settings. The thrust measurement is also utilized to calibrate the linear displacement of the spring pack which is measured directly to generate a thrust trace over valve cycle time intended to be representative of the actual stem thrust. Thus, the apparatus of Charbonneau et al is incapable of monitoring and measuring actual stem thrust directly over the entire valve operating cycle and, as mentioned previously, reliance on spring pack displacement as an indication of actual stem thrust gives rise to a number of inaccuracies. In addition, because this apparatus is incapable of measuring actual stem thrust on valve closure, certain assumptions rust be made in order to use the measured valve opening stem thrust to establish the close torque switch setting. The most important assumption is that the torque (and stem thrust) to open the valve is equal to the torque required to close the valve, i.e., it is assumed that spring pack displacement for a given opening thrust is exactly the same as spring pack displacement for an equal closing thrust. This assumption clearly ignores differences attributable to the weight of the valve plug and stem, variations in valve packing friction with direction, and variations in transmission assembly efficiency because valve opening and closing utilizes two different faces of the gear teeth.

Also, the Charbonneau et al system utilizes a measurement of current as the indicator of torque and limit switch actuation and, therefore, valve position. This requires a series connection to the torque and limit switches and, therefore, a break in the switch connections. In the nuclear industry, where large numbers of motor operated valves are used, a series connection requiring a break in the lead requires double verification of return to service which is costly and time-consuming.

U.S. Pat. No. 4,570,903 (Crass) also addresses the problem of direct measurement of valve stem thrust to allow accurate setting of the close torque switch, both initially and as a result of thrust variations related to system operating changes. The apparatus of Crass allows the direct measurement of valve stem thrust in a manner somewhat like Charbonneau et al. Like Charbonneau et al, however, only a single direct measurement of stem thrust can be made over the valve operating cycle. A load cell is operatively attached to the free upper end of the valve stem and is disposed to measure actual stem thrust only at the end of the valve closing stroke. The apparatus measures the thrust necessary to trip and deactivate the close torque switch. However, the apparatus cannot monitor and measure the actual valve seating thrust which may be substantially higher than the thrust necessary to trip the torque switch because of gear train inertia, delays in motor contactor drop-out, etc.

There is, therefore, presently no apparatus or method which can monitor actual valve stem thrust continuously and dynamically over the full operating cycle of the valve, from fully open to fully closed in both directions. Prior art apparatus and methods which provide capability for measuring actual valve stem load are limited in their ability to measure only a single such load in the valve operating cycle. Further, such a single thrust load measurement may not be the actual maximum thrust occurring at that point in the valve cycle. Where the prior art discloses the measurement of an indication of valve stem load over the entire operating cycle, such measurement is in fact only indirect and, as a result, not an accurate indication of actual valve stem thrusts.

SUMMARY OF THE INVENTION

The method and apparatus of the present invention, in its preferred embodiment, provide a system for monitoring and measuring the actual valve stem operating load in a motor operated valve. Load sensing means, such as load cells, are inserted directly between the valve body and the operator housing where they can sense a directly proportional part of the actual dynamic valve stem operating load at any position of the valve stem and plug over the full operating cycle of the valve. Signals representative of the sensed loads are converted into the actual valve stem operating loads and an output of those loads is generated.

Most conveniently, the load cells are inserted between the opposing mounting surfaces on the valve body and operator housing and secured in place by the mounting bolts. In this manner, the loads sensed by the load cells are the reaction forces between the valve body and the operator housing which result from the load transmitted to the valve stem by the operator. The load cells are preloaded in compression by the force of the mounting bolts to a level in excess of the maximum valve stem operating load resulting from valve closure.

Simultaneously with the monitoring and measurement of the valve stem operating loads, the operation of the torque and limit switches is monitored as a function of the valve plug position and correlated to the valve stem operating loads. Concurrently, a measurement of operator motor current as a function of the valve plug position may also be correlated to the switch operation and stem load outputs to enhance the analysis of proper operation of the valve and valve operator assembly.

In its broadest sense, the present invention provides the capability for monitoring and measuring a variable dynamic axial load induced in an operator assembly in which opposing bolted surfaces are subjected to varying tensile and compressive forces. As with the preferred embodiment, load sensing means are disposed between the opposing bolting surfaces and secured therebetween by a compressive preload so that the reaction forces to axial loads in either tension or compression can be sensed and measured over the full range of interest.

DETAILED DESCRIPTION OF THE PREFERRED EMBODIMENT

Figure 1:
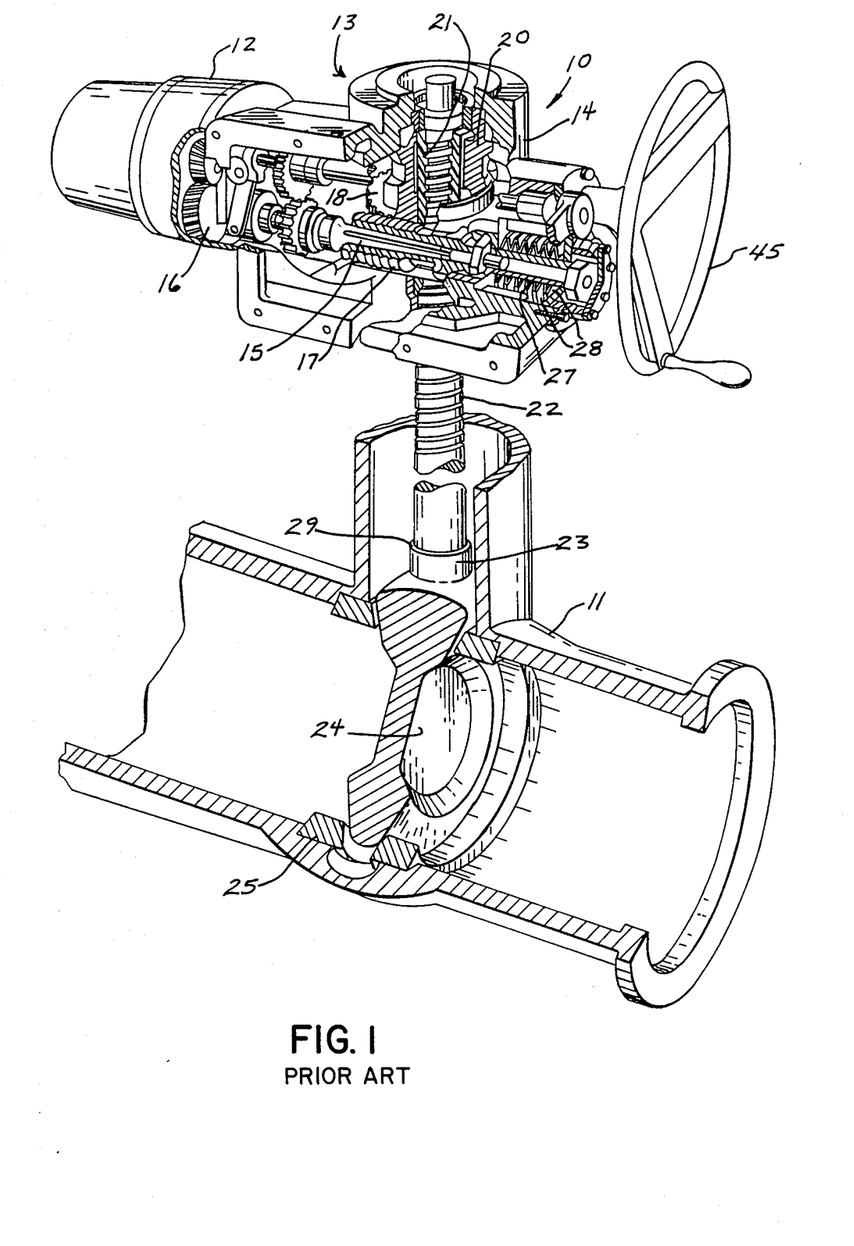
FIG. 1 is a perspective view of a typical valve and motor driven operator assembly with portions broken away to show details of the internal construction and operation.

FIG. 1 shows a conventional motor driven valve operator 10 operatively attached to a valve body 11. The operator 10 includes an electric motor 12 to provide the power for operating the valve and a power transmission assembly 13 for transmitting the operating load from the motor to the valve. The power transmission assembly is contained within an operator housing 14 which overlies and is attached to the valve body 11, as will be more fully described hereinafter.

The motor 12 drives a splined worm shaft 15 through a set of reduction gears 16. The worm shaft 15 drives a worm 17 mounted axially thereon and the worm, in turn, drives a worm gear 18. The worm gear drives an integrally attached drive sleeve 20 which contains a stem nut 21 that receives and engages the external threads of the valve stem 22. The drive sleeve 20 and stem nut 21 are journalled for rotation about the valve stem, but restrained from axial movement. Thus, rotation of the stem nut will result in a driving force being applied to the threaded valve stem and vertical axial movement thereof in either direction, depending upon the direction of rotation of the stem nut.

The valve stem 22 extends downwardly from the operator housing 14 into the valve body 11 to a journalled connection 23 with the valve disc or plug 24. Axial movement of the valve stem 22 will result in vertical movement of the attached plug 24 from the valve closed position with the plug in the valve seat 25, as shown, to an open position with the plug disposed vertically upward at a predetermined distance from the backseat. Backseating the valve is generally not desirable. However, part of the valve stem/plug connection 23 includes an annular shoulder 29 near the lower end of the stem 22 which will engage the backseat, if upward travel of the plug 24 on the opening stroke exceeds predetermined limits, as will be discussed further hereinafter.

A typical valve operator 10 is controlled by torque or position limiting switches to automatically deenergize the motor 12 when the valve plug 24 has reached a predetermined position of travel or has, at the end of its travel in either direction, caused a substantially higher level of thrust to be imposed on the stem 22 by the motor, which thrust is translated back through the transmission assembly 13 in the operator to a torque applied by the worm gear 18/worm 17 assembly. The worm 17 is attached to the operator housing 14 by a spring pack 27 comprising a series of Belleville washers 28. The torque applied by the worm gear 18 to the worm 17 is translated directly into an axial force on the worm. As the axial force on the worm increases, as a result for example of the valve plug 24 engaging the seat 25 at the end of the valve close stroke, the worm will move axially against the bias of the spring pack 27. To deenergize the motor when the torque has reached a desirable level, such as that necessary to seat the valve plug 24 and provide a leak-tight seal, axial movement of the worm rotates a torque switch arm which, in turn, opens a set of contacts to stop the motor. The amount of torque switch arm movement required to open the torque switch contacts may be preset by adjustable torque switch settings. Torque sufficient to cause axial movement of the worm 17 in the opposite direction, such as at the end of the valve open stroke, is controlled by another set of adjustable torque switch contacts which open as a result of opposite rotation of the torque switch arm.

In conjunction with the torque switches, the typical valve operator also includes corresponding open and close limit switches. The limit switches are rotary driven by the worm shaft 15 or the drive sleeve 20 and their motion is calibrated to coincide with axial movement of the stem 22 and the distance traveled by the attached valve plug 24. The limit switch may function as the primary control for the operator motor or as a backup to a torque switch. In addition to controlling the limits of valve plug travel, another important limit switch function is to bypass the open torque switch during unseating of the valve plug to avoid an unintended interruption of the valve opening stroke. Thus, proper setting and operation of the limit switches is also crucial to proper valve operation.

As previously mentioned, a number of factors inherent in the design and operation of a motor operated valve make use of spring pack displacement as a direct indication of valve stem load or thrust highly speculative and subject to sometimes great inaccuracies. A Belleville washer spring pack 27 is known to be non-linear in terms of axial displacement versus applied compressive force in both its free uncompressed state and at the opposite end when it is nearly totally collapsed. An attempt to correlate spring pack deflection to thrust or stem load in these areas will lead to errors. Therefore, the spring pack 27 is normally mounted with an axial preload to allow it to operate in its linear band. Under the dynamic conditions of valve operation, spring pack preload is translated directly back to and appears as a thrust load on the valve stem 22. The preload may vary substantially and is not easily measurable or compensated for. In addition, the weight of the valve plug 24 and stem 22 have a direct effect on stem load. The effect is, of course, directly opposite in the closing and opening directions, and can be especially important in large valves. Similarly, valve packing frictional forces must be overcome. These forces generally vary in the open and close directions and contribute in either case to total stem thrust required for proper valve operation. Finally, as can be seen from the construction of a typical operator, a worm/worm gear set operates with two different sets of gear tooth faces in the opposite open and close directions. Variations in wear will result in variations in the frictional forces and thus the thrust imposed on the stem from one direction to the other.

The use of deflection of the spring pack 27 to measure stem thrust requires that the spring pack preload, as transmitted to the stem, be equal to or greater than the sum of the frictional forces plus the weight of the stem and plug. This is because there can be no net operator imposed thrust on the stem to effect motion until the combined weights of the stem and plug and the packing and other frictional forces are overcome. However, if the spring pack preload is less than the sum of weight and friction forces, there will be spring pack displacement (and an indicated stem thrust load) before there is any actual load on the stem. Thus, by definition, the effects of packing friction and component weights cannot be monitored and measured by measuring spring pack deflection.

When monitoring and measuring spring pack displacement, there is no way of determining which, if any, of the foregoing variations is effecting stem thrust and, therefore, the torque available to operate the valve or the magnitude of such variations. In addition, monitoring and measuring spring pack displacement does not provide the ability to discriminate between thrusts associated with weight, changes in packing friction, preload variations, or other typical running thrusts associated with valve opening and closure.

Figure 2:
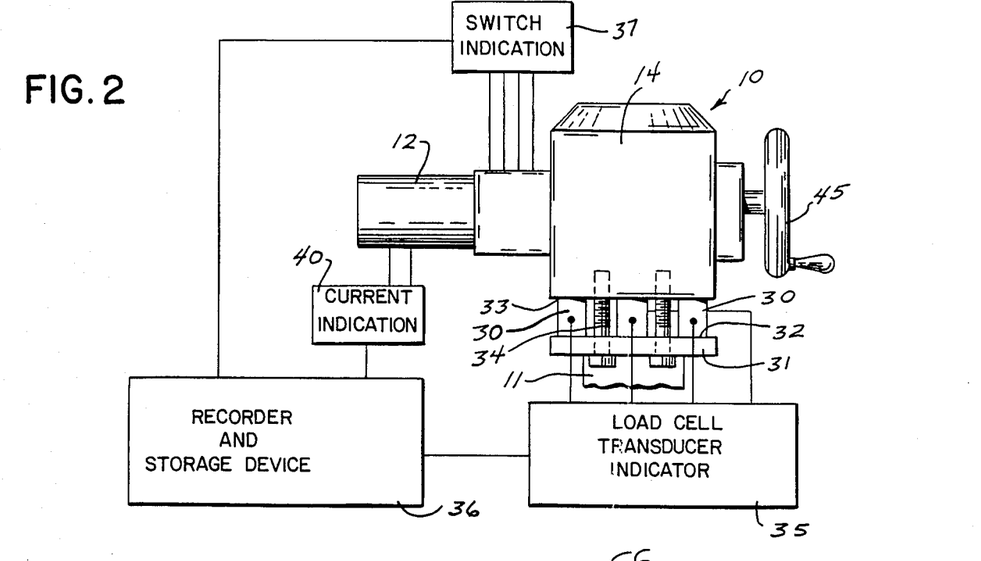
FIG. 2 is an elevational view of a portion of the valve and motor driven operator having attached thereto the valve stem load measuring apparatus of the present invention and showing generally the other control devices utilized in monitoring operator and valve performance.

Referring to FIG. 2, to provide a method and apparatus for the direct measurement of dynamic valve stem load, load sensing means in the form of a set of load cells 30 are inserted directly between the valve body 11 and the operator housing 14. The valve body 11 includes an upper mounting flange 31 including a flat mounting surface 32. The valve operator housing 14 includes an oppositely disposed mounting surface 33. A series of mounting bolts 34 extend upwardly through holes in the mounting flange 31 and are threaded into tapped holes in the mounting surface 33 of the operator housing 14. As the mounting bolts 34 are tightened, the load cells are secured between the mounting surfaces 32 and 33. Preferably, one load cell 30 is utilized for each mounting bolt 34.

The load imposed on the valve stem 22 by the operator 10 results in an equal and opposite reaction force on the mounting bolts 34. Thus, an axial compressive load on the stem as the valve plug 24 engages the seat 25 as the valve closes will result in an opposite tensile load in the bolts, distributed equally between them. Conversely, a tensile load on the valve stem if the plug comes into contact with the backseat at the end of the valve open stroke will result in distributed compressive force in the mounting bolts. The installed load cells 30 are capable of sensing a directly proportional part of the actual load on the mounting bolts and, thus, the actual operating load on the valve stem 22 at any position of the valve plug at or between its fully open and fully closed positions.

In the specific embodiment shown, it is important that the load cells 30 be mounted between the valve and valve operator with a preload. The preload should be sufficient to impose a compressive load on the load cells in excess of the maximum expected valve stem operating load resulting from valve closure. Because the maximum compressive load on the valve stem during closure results, as mentioned above, in a tensile force on the mounting bolts 34, the preload is necessary to prevent the load cells from completely "unloading" in this situation. In addition, however, the preload on the load cells also results in a tensile preload in the mounting bolts which assures operation on the linear portion of the stress-strain curve for the bolts. This, in turn, assures the maintenance of a direct linear relation between the load sensed and the actual valve stem operating load.

The load sensed by the load cells is, of course, less than the actual stem thrust because of the proportion of the total load taken up by the mounting bolts. Therefore, the load sensed by the load cells is converted into the actual valve stem operating load by the application of an appropriate correction factor. The correction factor depends upon the physical properties of the bolt material used, the size of the bolts, and the free length of the bolted connection, and may be determined empirically for a particular valve/operator assembly. For a particular assembly, the correction factor is a constant by which the load sensed by the load cells is multiplied to obtain the actual valve stem load.

The load cell signals, representative of a directly proportional part of the actual valve stem thrust load, are fed to a load cell transducer/indicator device 35 where they are converted to an analog output proportional to the sum of the load cell outputs. The analog output from the load cell transducer is fed to a recording analyzer 36 (such as a Yokogawa model No. 3655E) which multiplies the output by the correction factor constant and displays the resultant stem thrust. The recording analyzer can also provide a graph or trace of actual dynamic valve stem thrust over the full valve operating cycle. The recording analyzer is also utilized to provide an output indication, including traces, of the other measured parameters, as will be more fully described below.

To provide an indication of torque and limit switch operation over the valve cycle simultaneously with the stem load measurement and indication, a switch indicator circuit 37 (FIG. 3) is attached to the appropriate contacts in the operator torque and limit switch circuit 38 (FIG. 4) to provide an output voltage representative of switch actuation to the recording analyzer 36. Switch operation voltage signals generated and recorded during the valve operating cycle permit accurate timing of both torque and limit switch operation for precise adjustment. Correlation of switch timing and valve stem thrust traces enable accurate analysis of valve operation and the diagnosis of operating problems; as will be discussed below.

Figure 3:
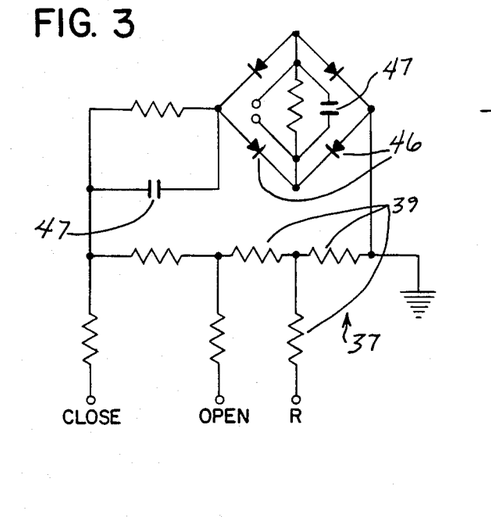
FIG. 3 is a schematic of the torque and limit switch voltage monitoring circuit used to generate an output of switch activation sequence over the valve operating cycle.

The network of resistors 39 used in the switch indicator circuit 37 does not add a significant electrical load to the operator control circuit. The diodes 46 convert the ac switch voltage to a dc output signal for the recorder 36. The capacitors 47 help eliminate ac ripple effects to provide smoother trace curves. The switch indicator circuit 37 does not require any additional contacts and, most importantly, can be installed without breaking any leads or contacts in the operator switch circuit 38.

The final measured parameter is the current to the operator motor 12. A current indicator 40, which may comprise an ordinary inductive ammeter, provides current signals to the recording analyzer 36 simultaneously with the thrust load and switch actuation signals, such that an output trace of motor current over the valve operating cycle may also be obtained. Operator motor current traces are known in the art, but are helpful nonetheless to supplement the stem thrust and switch actuation traces previously described.

Figure 4:
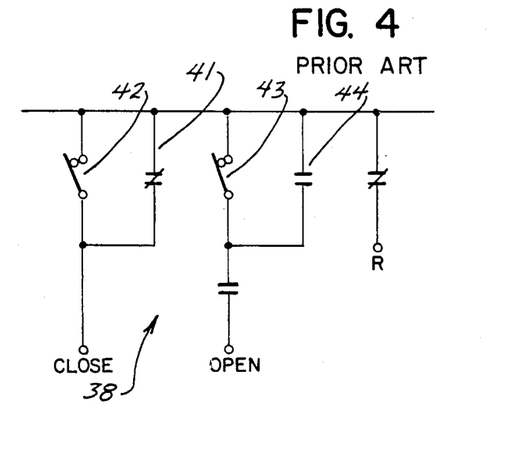
FIG. 4 is a schematic of a portion of a conventional motor driven operator control circuit to which the monitoring circuit of FIG. 3 is connected.

Before describing in more detail the installation of the apparatus of the present invention and the method of its operation, a few more detailed comments on the operation of a typical valve and valve operator are believed to be helpful. Referring now to FIGS. 1 and 4, with the valve in its full open position and the plug 24 a predetermined distance from the backseat, the bypass limit switch 41 around the close torque switch 42 is closed. This bypass limit 41 must be closed when valve closure is initiated so that the "hammerblow" within the operator which results in flutter or opening of the close torque switch will not cause the operator motor 12 to stop. Most operators have a built in hammerblow in the worm gear 18 to drive sleeve 20 connection in the form of a slack region between their engaging surfaces which, upon motor reversal, allows the motor and gearing to come up to speed. Bypass limit switch 41 is closed (and close torque switch 42 bypassed) only for a small portion of the closing stroke as plug 24 moves off the backseat (in the generally undesirable event that the valve backseated when opened).

As the valve plug reaches and begins to engage the main seat 25, there is a rapid build-up of stem thrust to a level where the close torque switch 42 (which is no longer bypassed) trips open to stop the motor. Normally, however, inertia in the system will result in additional thrust being imposed on the stem which, if the torque switch has been set to trip at the recommended torque necessary to properly seat and seal the valve, may result in a substantial thrust overshoot.

The initiation of valve opening operates in a similar manner. The open torque switch 43 must be bypassed during unseating of the valve so that the unseating hammerblows built into the operator and in the valve don't result in premature or spurious tripping of the open torque switch and interruption of the valve opening stroke. The open torque switch 43 is bypassed only for a short period of the opening stroke as plug 24 moves off the seat 25. Termination of the valve opening stroke, however, is typically controlled in a different manner than valve closure. Thus, the open limit switch 44 is set to trip just prior to the end of open travel of the plug 24 so that system inertia will cause the plug to "coast" to stop a predetermined distance from the backseat. This is to avoid backseating of the valve and, in this situation, the open torque switch 43 functions as a back up to the limit switch 44. If the limit switch fails to operate properly, the torque switch will limit the maximum thrust or load which can be imposed by the plug on the backseat.

To calibrate a new or rebuilt motor operated valve or to test an existing installation, the installation and operation of the apparatus and method of the present invention are essentially the same. In the case of a new valve installation, it is important preliminarily to install a "deadman" switch in the hot lead to the operator control circuit to permit emergency shutdown in the case of a wiring error or the like. Also, the limit switches are set to estimated settings. Then, for either existing or new installations, the procedure is as follows.

First, the valve plug/stem assembly is manually backseated by turning the handwheel 45. The limit switches are then disengaged and the mounting bolts 34 are loosened. The operator-valve assembly is manually operated in the close direction by turning the handwheel in the opposite direction until the operator is raised an amount sufficient to permit the load cells to be placed between the mounting surfaces 32 and 33 of the mounting flange 11 and operator housing 14, respectively. Typically, packing friction is large enough to allow the operator to be raised without seating the plug. The operator is then manually lowered. The mounting bolts 34 are tightened enough to impart the desired preload to the load cells as previously described. The valve plug is returned to the backseat and the limit switches are reengaged. The switch indicator circuit 37 is connected to the operator switch circuit 38. The ammeter or current indicator 40 is attached to the motor lead to complete installation of the apparatus. The valve may then be cycled in a normal manner and measurement of the three monitored parameters made as the valve cycles, and the readings or traces of the parameters are generated by the recording analyzer 36.

Figure 5:
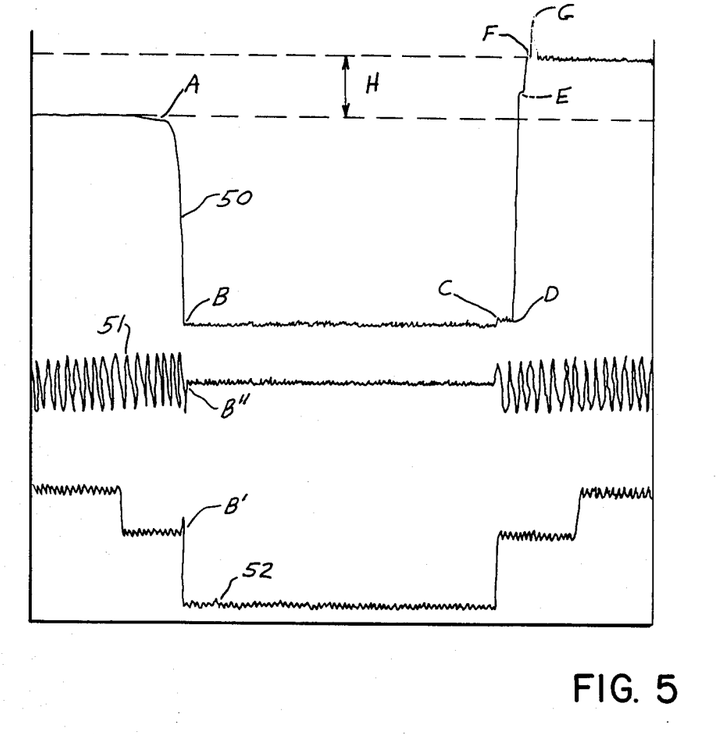
FIG. 5 is a graph or trace of the various measured parameters plotted as a function of the valve position over its operating cycle.

FIG. 5 is a graph typical of one generated by the recording analyzer 36 as a result of monitoring the operation of a motor operated valve and measuring the three parameters over the operating cycle. The traces generated, from top to bottom, are of the stem thrust 50 or load, motor current 51, and torque and limit switch actuation 52, each plotted with respect to the position of the valve plug in the operating cycle. Valve plug position (or abscissa on the trace) is, of course, also representative of operating cycle time. Referring first to the stem load trace, point A represents the point where the valve plug makes initial contact with the main seat 25 and the beginning of the rapid build up of thrust with time (or plug seating). At point B the close torque switch trips, shuts off the motor, and motion stops. It should be noted that, because this is a relatively slow operating valve, there is no significant overthrust as a result of system inertia after the close torque switch opens. The vertical distance between points A and B gives a precise measurement of seating stem thrust, free from the various inaccuracies inherent is prior art methods of indirect stem thrust measurement.

From points B to C, the valve is closed and the motor inoperative. At point C, the open stroke is initiated and the small indicated thrust represents relaxation of the Belleville washers 28 in the spring pack 27. From points C to D, the operator gear train is reversing directions and the "lost motion" or slack between the engaging surfaces of the worm gear and drive sleeve is observed. At point D, the built-in hammerblow between the worm gear 18 and the drive sleeve 20 helps to relieve the energy stored in the stem as a result of the seating thrust. From points D to E, this stored energy is relieved. At point E, the break in the thrust curve represents the reversal of the engagement between the stem nut 21 and the valve stem 22. The thrust load again increases from point E to point F as the valve packing material is realigned in the upward or opening direction. The flat spot in the thrust load curve at point F is representative of the free play in the connection 23 between the valve stem and the plug. Once that play is taken up, the second hammerblow takes place and is represented by the thrust from point F to point G.

The slightly downwardly sloping portion of the thrust trace 50 from its origin to point A represents the running thrust necessary to move the stem and plug between the open and closed positions. Under static conditions and assuming a constant downward velocity, the force to close (running stem thrust) equals the frictional forced which must be overcome less the weight of the stem and plug. In comparison, the slightly upwardly sloping portion of the thrust trace from point F to the end of the trace (eliminating the hammerblow spike G) is the running stem thrust as the valve moves from the closed to open position. The running thrust to open the valve equals the frictional forces plus the weight of the stem and plug. In the thrust trace 50, which is a representation of the cumulative applied thrust over a full operating cycle, the closing and opening running stem thrusts are displaced vertically from one another by an amount H equal to the sum of the two in accordance with the formula: H=(friction+weight)+(friction−weight)=2 (friction). Since in the summation of the running close and running open thrusts, the weight of the stem and plug cancel out, the vertical displacement H is two times the frictional force (assuming equal frictional forces in the close and open directions).

Correlation of the trace 52 of switch actuation, at the bottom of FIG. 5, with the stem thrust trace 50 provides an indication of actual thrust at the point of switch actuation. For example, a correct indication of actual stem thrust at the point that the close torque switch trips (point B'), will indicate if the valve manufacturer's design thrust is being properly attained. As indicated previously, the design thrust is based on the specified operating differential pressure across the valve and that stem thrust must be reached, as an absolute minimum, to assure that the valve will seat and properly seal under design conditions. In addition, accurate monitoring of torque switch trip and correlation with the resultant thrust drop-off with motor stoppage can pinpoint problems in the motor control. For example, torque switch trip without a corresponding drop-off in thrust can indicate a possible malfunctioning motor contactor. If the motor contactor does not drop out when the torque switch opens (because, for example, it has become dirty or magnetized), a significant and potentially damaging overthrust may occur.

The motor current trace 51, in the center of FIG. 5, can also help pinpoint operator problems more precisely. For example, looking at and correlating only the switch actuation and stem load traces, one may not be able to determine if an overthrust situation is due to a motor contactor problem or system inertia. However, examination of the corresponding current trace allows discrimination between the two and identification of the real source of the problem, because thrust resulting from gear train inertia will not be accompanied by corresponding current flow. In the current trace 51 shown, the current shut-off at point B" coincides with the opening of the close torque switch at B' and is indicative of a properly functioning operator at the point of valve closing.

Figure 6:
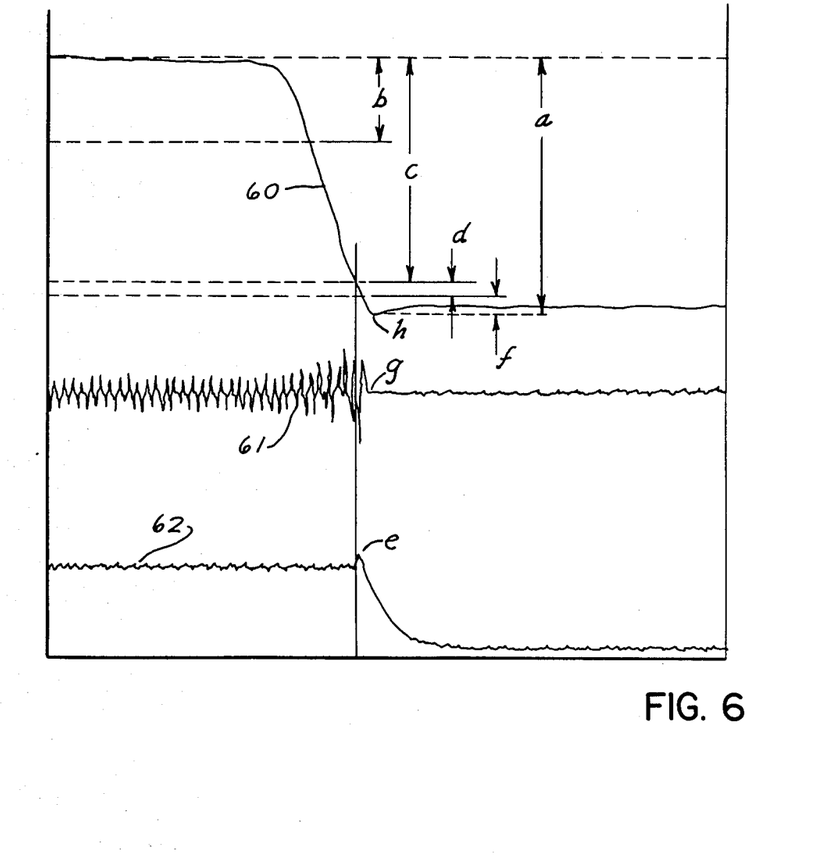
FIG. 6 is a trace, similar to FIG. 5, of the stem thrust, motor current and switch actuation of a motor operated valve over the closing portion of the valve cycle.

The traces in FIG. 5 are representative of a properly operating valve and actuator. However, the diagnosis and analysis of problems in the operation of motor operated valves is a principal objective of the apparatus and method of the present invention. FIG. 6 is a trace of the stem thrust 60, motor current 61 and switch actuations 62 of the close stroke portion of a motor operated valve "as found" in operation. The actual measured valve stem thrust to close was 8227 $1b-f$ (vertical dimension (a) in FIG. 6). This compared to a recommended design stem thrust of 2757 $1b-f$ based on a calculation of the thrust required to provide a leaktight seal at design flow, temperature and differential pressure, as shown by dimension (b). In actual practice, the close torque switch is purposely set to trip open at a thrust level somewhat in excess of the design thrust to provide a margin of safety to assure the critical leak-tight seal is attained. However, the actual measured stem thrust in the FIG. 6 trace 60 is nearly three times the design thrust and greatly in excess of that needed to provide a typical safety factor. In addition, the greatly excessive closing torque actually imposed was aggravated by an overthrust of about 16 percent. The overthrust is the increment of total thrust imposed after the torque switch opens. Referring to the switch actuation trace 62 in FIG. 6, point (e) indicates the opening of the torque switch at which point a corresponding thrust level shown by dimension (c) on the thrust trace 60 had been reached. Total overthrust is thus the difference between total stem thrust (a) and the thrust (c) at the opening of the close torque switch. The overthrust itself results directly from two operational factors of the valve operator. First, there is a time lag after the torque switch opens (point (e) on trace 62) and the motor contactor opens to halt current flow to the motor (point (g) on the current trace 61) and, during this time lag, overthrust increment (d) results. In addition, system inertia after current flow ceases results in overthrust increment (f). Overthrust increments (d) and (f) are particularly significant in magnitude in valves having a relatively fast stroke time.

By utilizing the traces of FIG. 6 to analyze actual total stem thrust and the factors contributing to it, a proper torque switch setting may be made which will provide an adequate margin of safety but will avoid and eliminate greatly excessive and potentially damaging thrust loads.

It is clear from the foregoing description that the apparatus and method of the present invention permit the monitoring and measurement of stem thrust in a motor operated valve with a precision not attainable in the prior art. Indeed, the present system permits the detailed identification of valve and operator characteristics which could not be measured at all or even detected in prior art systems.

We claim:

1. In a valve and valve operator assembly including a valve body, a valve plug within the body movable to and between a valve open position and a valve closed position, a valve stem attached to he valve plug, the valve operator assembly including a source of motive power, an operator housing attached to the valve body to provide an attachment interface therebetween, and power transmission means operatively connecting the power source and the valve stem and disposed to transmit an operating load from the power source to the stem for effecting movement of the valve plug, an apparatus for monitoring and measuring the actual valve stem operating load comprising:

(a) load sensing means operatively connected to the attachment interface between the valve body and the operator housing for sensing a force that is directly proportional to the dynamic valve stem operating load at any position of the valve plug and for generating a signal representative of the load sensed; and (b) means for converting the load signal into an actual dynamic valve stem operating load signal and for generating an output indication of the valve stem operating load.

2. The apparatus as set forth in claim 1 wherein the attachment interference between the operator housing and the valve body includes opposing mounting surfaces, and further including:

(a) mounting bolts for attaching the operator housing to the valve body; and, (b) the load sensing means disposed between the mounting surfaces and secured therebetween by the attaching force of the mounting bolts.

3. The apparatus as set forth in claim 2 wherein the load sensing means comprises an array of load cells.

4. The apparatus as set forth in claim 3 wherein the load cells are preloaded by the attaching force of the mounting bolts to a level in excess of the maximum valve stem operating load resulting from valve closure.

5. The apparatus as set forth in claim 4 wherein the array of load cells comprises a single load cell for each mounting bolt.

6. In a valve and valve operator assembly including a valve body, a valve plug within the body movable to and between a valve open position and a valve closed position, a valve stem attached to the valve plug, the valve operator assembly including a source of motive power, an operator housing attached to the valve body to provide an attachment interface therebetween, and power transmission means operatively connecting the power source and the valve stem and disposed to the stem for effecting movement of the valve plug, a method for monitoring and measuring the actual valve stem operating load comprising the steps of:

a. attaching load sensing means to the attachment interface for sensing the reaction forces between the valve body and the operator housing resulting from the load transmitted to the valve stem by the power source;

b. sensing the reaction forces at any position of the valve plug at or between the open and closed positions;

c. generating signals representative of the sensed reaction forces;

d. converting the reaction force signals into actual valve stem operating load signals; and, e. generating an output indication of the valve stem operating loads.

7. The method as set forth in claim 6 wherein the operator housing and valve body include opposing mounting surfaces and wherein the step of attaching the load sensing means comprises inserting the load sensing means between the mounting surfaces.

8. The method as set forth in claim 7 wherein the load sensing means comprises an array of load cells.

9. The method as set forth in claim 8 including the steps of attaching the operator housing to the valve body and applying an attaching force sufficient to preload the load cells to a level in excess of the maximum valve stem operating load resulting from valve closure.

10. The method as set forth in claim 9 wherein the operator housing and valve body are attached with mounting bolts.

11. The method as set forth in claim 10 including the step of establishing empirically a correction factor to compensate for the portion of the reaction forces taken up by the mounting bolts, and wherein the step of converting the reaction force signals comprises multiplying the reaction force signals by the correction factor.

12. The method as set forth in claim 10 wherein the array of load cells comprises a load cell for each mounting bolt.

* * * * *

UNITED STATES PATENT AND TRADEMARK OFFICE
CERTIFICATE OF CORRECTION

PATENT NO. : 4,856,327
DATED : August 15, 1989
INVENTOR(S) : Timothy R. Branam et al It is certified that error appears in the above-identified patent and that said Letters Patent is hereby corrected as shown below:

Column 13, claim 2, line 17, change "interference" to --interface--.

Signed and Sealed this

First Day of January, 1991

Attest:

HARRY F. MANBECK, JR.

*Attesting Officer*  Commissioner of Patents and Trademarks